J. B. MYNATT.
Gate.
No. 219,502. Patented Sept. 9, 1879.
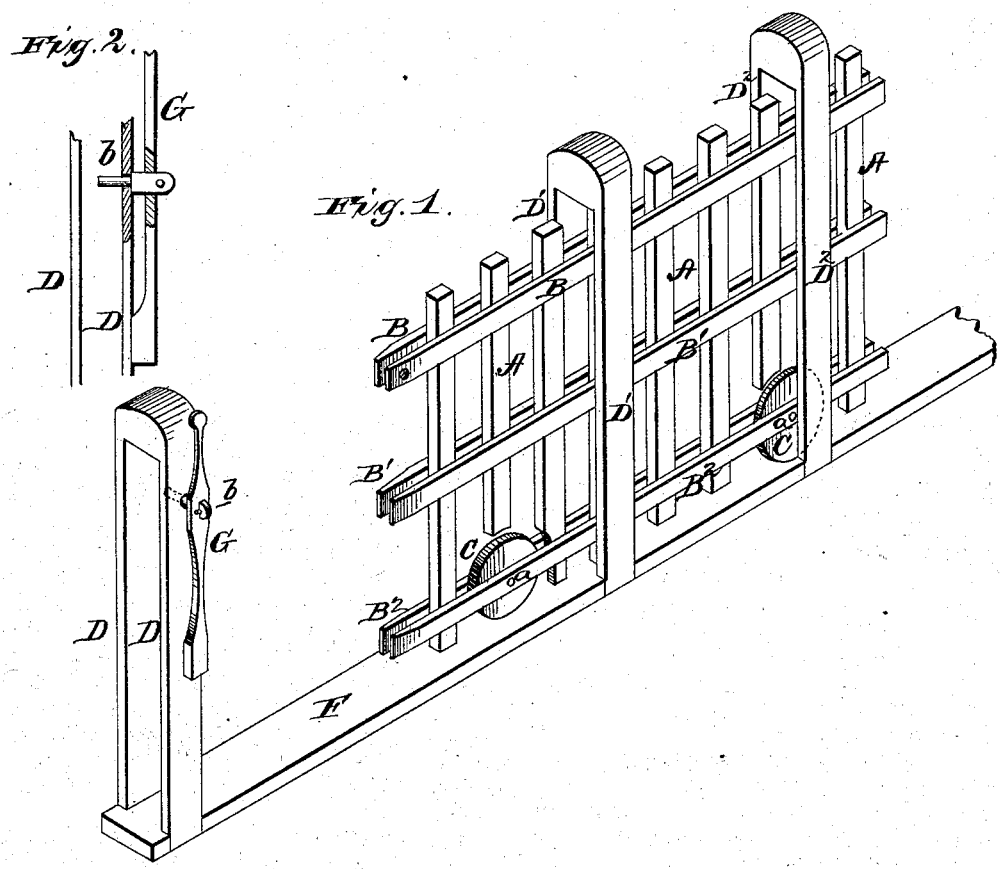
WITNESSES
Franck L. Ourand
H. Aubrey Toulmin
INVENTOR
John B. Mynatt
Alexander &c.
ATTORNEYS

UNITED STATES PATENT OFFICE.

JOHN B. MYNATT, OF EASTA BOGA, ALABAMA.

IMPROVEMENT IN GATES.

Specification forming part of Letters Patent No. 219,502, dated September 9, 1879; application filed April 23, 1879.

*To all whom it may concern:*

Be it known that I, JOHN B. MYNATT, of Easta Boga, in the county of Talladega, and in the State of Alabama, have invented certain new and useful Improvements in Gates; and do hereby declare that the following is a full, clear, and exact description thereof, reference being had to the accompanying drawings, and to the letters of reference marked thereon, making a part of this specification.

My invention relates to that class of gates which work upon wheels; and it consists in the combination, with a gate of such character, of a peculiarly-constructed latch, as will be hereinafter more fully set forth.

In order to enable others skilled in the art to which my invention appertains to make and use the same, I will now proceed to describe its construction and operation, referring to the annexed drawings, in which—

Figure 1 is a perspective view of my gate, and Fig. 2 is a detailed view of a part thereof.

The gate proper is composed of a series of vertical bars, A, placed suitable distances apart, and connected by three pairs of horizontal bars, marked, respectively, from top to bottom B, $B^1$, and $B^2$. Between the bottom horizontal bars, $B^2$ $B^2$, near each end of the gate, is mounted a wheel, C, of any suitable size, and having its periphery plain or smooth. The gate rests perpendicularly on these wheels, which revolve on axles $a$ $a$, thus creating less friction than if the wheels were fast on the axles and these revolved in the bars $B^2$. Over the wheels C the vertical bars forming the gate are cut away, as shown.

D, $D^1$, and $D^2$ represent three pairs of vertical posts, so set into the ground as to freely admit of the passage of the gate between each pair.

When the gate is closed the posts D $D^1$ hold it against any diagonal force or lateral movement, and the posts $D^2$ serve as guides to keep it on the railway while opening and closing.

F is a railway, having a plain level surface, the length of which is twice the distance the gate travels. Upon this railway the gate stands and is rolled in opening and closing.

To one of the posts D is attached a spring, G, from which projects a pin, $b$, through a hole in said post, and when the gate closes this pin springs into a hole, $x$, in the end of one of the top horizontal bars, B, of the gate, thus keeping the gate closed until the spring is pulled back with the hand, when the gate can be opened.

In the construction of the gate the middle horizontal bars, $B^1$, admit of the use of large wooden wheels C instead of casters, and these wheels, being of large diameter, give the gate easy motion, and as they revolve so many times less in opening and closing the gate than small wheels, they will last much longer.

Having thus fully described my invention, what I claim as new, and desire to secure by Letters Patent, is—

In combination with a gate, substantially as herein described, and working on wheels C C, the spring G, with pin $b$, and the post D, substantially as and for the purposes herein set forth.

In testimony that I claim the foregoing I have hereunto set my hand this 8th day of April, 1879.

JNO. B. MYNATT.

Witnesses:
H. AUBREY TOULMIN,
A. JACKSON.